United States Patent [19]  [11]  4,262,840
Grönert et al.  [45]  Apr. 21, 1981

[54] ROTOR FOR HIGH OPERATING SPEEDS

[75] Inventors: Heinz Grönert, Emmering; Jochen Vetter, Karlsfeld; Manfred Eckert, Dachau, all of Fed. Rep. of Germany

[73] Assignee: Maschinenfabrik Augsburg-Nürnberg AG, Munich, Fed. Rep. of Germany

[21] Appl. No.: 911,315

[22] Filed: Jun. 1, 1978

[51] Int. Cl.³ .................... B01D 45/12; B04B 5/00
[52] U.S. Cl. .................... 233/1 R; 29/148.4 R; 74/572; 415/212 A; 416/241 R
[58] Field of Search ........ 233/1 R, 1 A, 1 E, DIG. 1, 233/27, 23 R, 23 A, 1 C; 57/76, 58.89; 416/241 R; 415/212 R; 74/572; 29/132, 148.4; 239/214, 681

[56] References Cited
U.S. PATENT DOCUMENTS

| 2,670,849 | 3/1954 | Dunmire | 233/2 |
| 3,108,955 | 10/1963 | Boyland | 233/27 |
| 3,216,655 | 11/1965 | Wind | 233/27 |
| 3,913,828 | 10/1975 | Roy | 57/76 |
| 4,056,225 | 11/1977 | Hein | 233/1 A |

Primary Examiner—Robert W. Jenkins
Attorney, Agent, or Firm—Craig & Antonelli

[57] ABSTRACT

A high-speed rotor constructed of elemental boron and fashioned as a hollow element such as a centrifugal drum.

26 Claims, 5 Drawing Figures

FIG. 4.
FIG. 5.
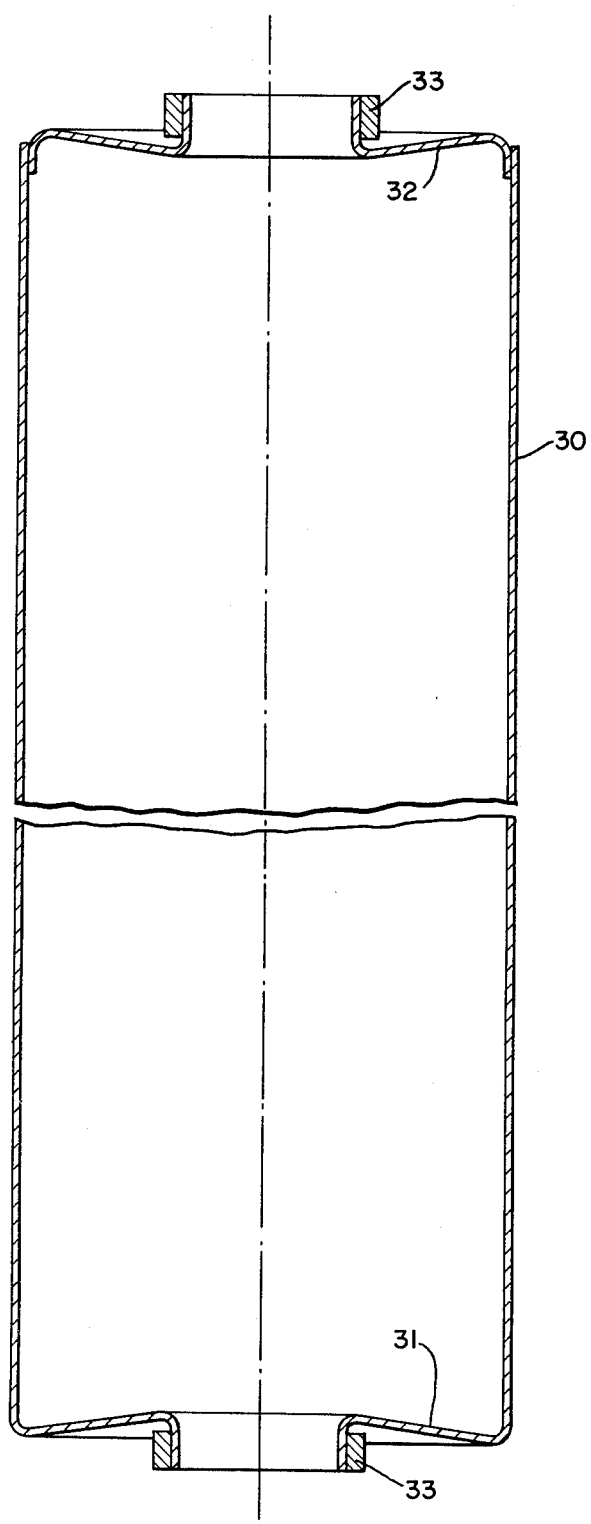
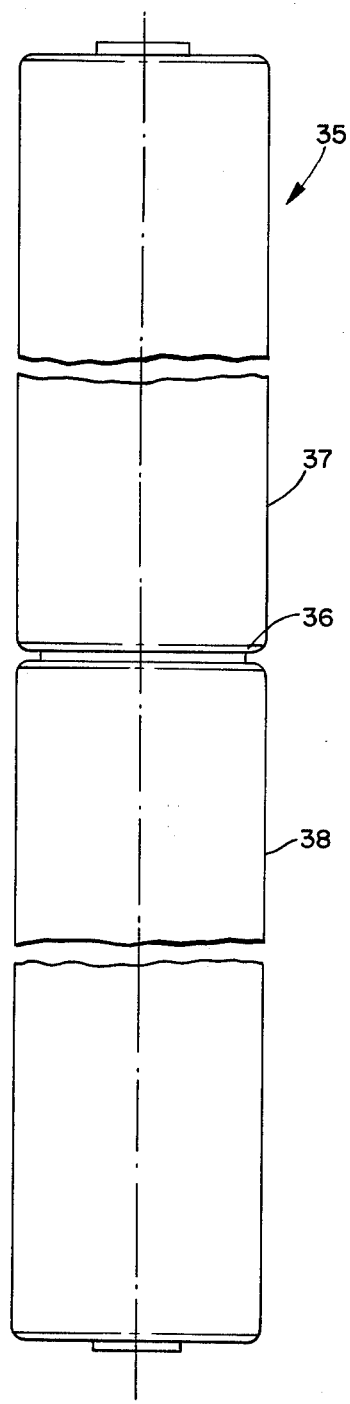

ROTOR FOR HIGH OPERATING SPEEDS

The present invention relates to a rotor construction and, more particularly, to a rotor fashioned as a hollow cylinder, especially a centrifugal drum, operable at high speeds of rotation and a method for the manufacturing of such rotor.

High efficiency rotors are utilized in various fields of technology such as, for example, in the case of turbines or centrifuges for the separation of gaseous or liquid media. With the increasing progress or advancements in technology, rotors are operated at ever higher speed limits.

To circumvent difficult problems in the dynamic considerations of the rotor and the mounting bearing constructions, the rotors are generally designed for operation in a sub-critical range. In other words, the length of the rotor is designed, in dependence upon the diameter and on the maximally permissible speed for the respectively employed materials, so that the natural frequency remains above the frequency of rotation of the rotor.

Assuming identical rotor speeds, it is possible to increase the length of sub-critical rotors in proportion to the rotor diameter, not considering constants dependent on the material.

In order to obtain an increase in velocity in connection with rotors of a relatively great length, so-called "multi-story" rotors have been developed which operate in super-critical ranges. For this purpose, the rotors are sub-divided into individual sections by so-called tubular pleats with the individual sections being connected only with extremely low bending resistance. Thereby, bearing forces can be kept low when traversing the critical speeds of revolution. However, this technique is utilized only with rotors having a homogeneous structure such as, for example, steel rotors. With, for example, carbon fiber reinforced synthetic resins which have a higher tension length than steel, such resins cannot be employed in combination with this technique for use in high efficiency, large length rotors.

While several bearing techniques and/or constructions have been proposed so as to permit operation of rotors in a super-critical range, the bearings are of a very special construction and, consequently, are very expensive. Moreover, stronger drive mechanisms are required for driving the rotors due to the large deflections occurring during the traversal of the critical natural frequencies.

The limits for the rotor speed at a given geometry of the rotor are set by the material selected for constructing the rotor. A governing factor for the peripheral speed of hollow rotor elements is the so-called tension length or the ratio of the tensile strength at rupture to the density.

The most favorable materials known which follow this relationship are glass fiber-epoxy resin composite, high strength steel, "Kevlar"-epoxy resin composite, carbon fiber-epoxy resin composite, and similar materials. The substances utilized in the composite materials, though exhibiting substantially more favorable tension length than steel, due to their much lower density, cannot be exploited with respect to this property to the full extent in view of the fact that they must be bonded to an embedding composition which is necessary in a rotor construction.

The aim underlying the present invention essentially resides in providing rotors of the type described hereinabove, which rotors have a relatively great length and can be operated at relatively high peripheral rotor speeds.

In accordance with one feature of the present invention, a rotor is provided which consists essentially of elemental boron.

Boron, a non-metallic element, can be produced in the amorphous and crystalline forms. When in the crystalline form, next to the diamond, boron is the hardest substance and, for this reason, has gained increasing importance in recent years in the abrasive industries.

Successful attempts have been made in the United States in the 1950's to convert the hard, brittle element, which can be melted only with difficulties, into a high strength, relatively elastic form, namely, a fiber. A fine substrate filament of tungsten having a thickness of 10-12 microns is coated with boron by means of a vapor-phase deposition to attain a filament thickness of up to 100-130 microns.

Filaments produced in the above-noted manner exhibit astonishingly high strength values. However, even this high strength filament of boron, just as with other filaments or fibers, can be utilized only in a composite with an embedding composition, thus loosing a large proportion of its original specific strength.

Moreover, boron filaments have been utilized for structural components in aeronautics and space applications with the boron filaments being connected into strips by an aluminum matrix.

In accordance with the present invention, rather than utilize a conventional fiber matrix composite, the rotor is manufactured as a complete shaped component of boron.

By constructing a rotor in accordance with the present invention, strength values can be attained in the shaped component of the hollow element which are comparable to those of boron filaments to such an extent that the permissible maximum velocities of the rotor can be doubled as compared with an identical rotor made of steel.

For reasons of economy, according to the present invention, it is possible to manufacture only a rotor shell of boron, which shell is under especially high stresses during rotation. However, it is also possible to produce the entire rotor with end lids of boron and, in this connection, the shell and end components can be either separate from one another or one or both end lids and the shell may be constructed as an integral component.

According to another feature of the present invention, to provide for the bearing and drive means, the end lids are fashioned directly with contours which serve for attachment of the drive and/or bearing elements.

Advantageously, for stress equalization, the inner zone of the lids of the rotor, which zone serves for receiving bearing and drive components, is provided with supporting rings of boron or another material on the inside of the lid and/or around annular shoulders molded integrally with the lid for receiving and mounting the drive and/or bearing elements.

To compensate for stresses which can occur during rotation, radial circular symmetrical inclinations are provided on the lid surface. Additionally, the shape of the end lids in an inner zone as well as transitions to the rotor shell and toward the inner contour are configured so as to be optimal from a stress viewpoint.

Moreover, according to the present invention, the rotor, consisting essentially of elemental boron, is fashioned with a geometrically undisturbed tubular geometry for permitting subcritical operation.

In accordance with the method of the present invention for the manufacture of a rotor of elemental boron, a substrate is produced having a surface contour which corresponds to a desired shape of the rotor with elemental boron being deposited from the gaseous or vapor-phase on the inside and/or outside of the substrate.

By virtue of the method of the present invention, it is possible to produce a rotor shell having end lids which are either separate or integrally formed with the shell. Moreover, contour configurations in the end lids to, for example, permit attachment of bearing elements, drive means, and/or discharge systems, can be directly incorporated in the end lids during the shaping step of the substrate. The substrate body may be constructed of metal such as, for example, tungsten, or of a graphite or ceramic material. The substrate body may either in whole or in part remain as an integral component of the rotor or may be completely removed from the rotor and subsequently be destroyed as a useless mold.

Due to the homogeneous structure of rotors manufactured from elemental boron, it is possible to manufacture such rotors during the vapor-phase deposition step directly with folds of low bending resistance in the shell portion so that the rotors exhibit the advantages of a "multi-story" super-critical mold of construction which distinguishes steel rotors.

Accordingly, it is an object of the present invention to provide a rotor and method of manufacturing such rotor which avoid, by simple means, the disadvantages and shortcomings encountered in the prior art.

Another object of the present invention resides in providing a rotor and method of manufacturing such rotor which are readily adaptable to a variety of different requirements and/or uses.

A further object of the present invention resides in providing a rotor of a relatively large length which may be operated at twice the maximum velocity of an identical rotor constructed of steel.

An additional object of the present invention resides in providing a rotor which functions reliably in sub-critical and super-critical ranges of operation.

Yet another object of the present invention resides in providing a rotor which is simple in construction and, therefore, relatively inexpensive to manufacture.

These and other objects, features and advantages of the present invention will become more apparent from the following description when taken in connection with the accompanying drawings which show, for the purposes of illustration only, several embodiments in accordance with the present invention, and wherein:

FIG. 4 is a longitudinal cross-sectional view of a further embodiment of a rotor according to the present invention; and FIG. 5 is a plan view of a "multi-story" rotor constructed in accordance with the present invention.

Figure 1:
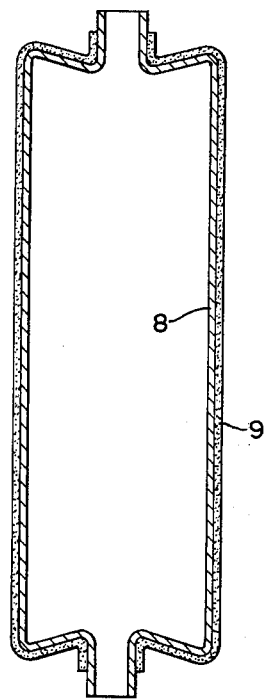
FIG. 1 is a cross-sectional view of a rotor shell arranged on a substrate in accordance with the present invention.

Referring now to the drawings wherein like reference numerals are used throughout the various views to designate like parts and, more particularly, to FIG. 1, a substrate 8, shaped as a hollow element and made of, for example, tungsten, a ceramic material, graphite, or some other material, is coated from the outside and/or the inside with a boron layer 9. The substrate 8 is thereafter removed either entirely or partially so that the boron layer 9 essentially remains as a hollow body forming a rotor shell. If a bilateral coating procedure is carried out so that the boron layer 9 is provided on the inside and outside of the substrate 8, the substrate 8 is retained, so-to-speak, as a ballast.

Figure 2:
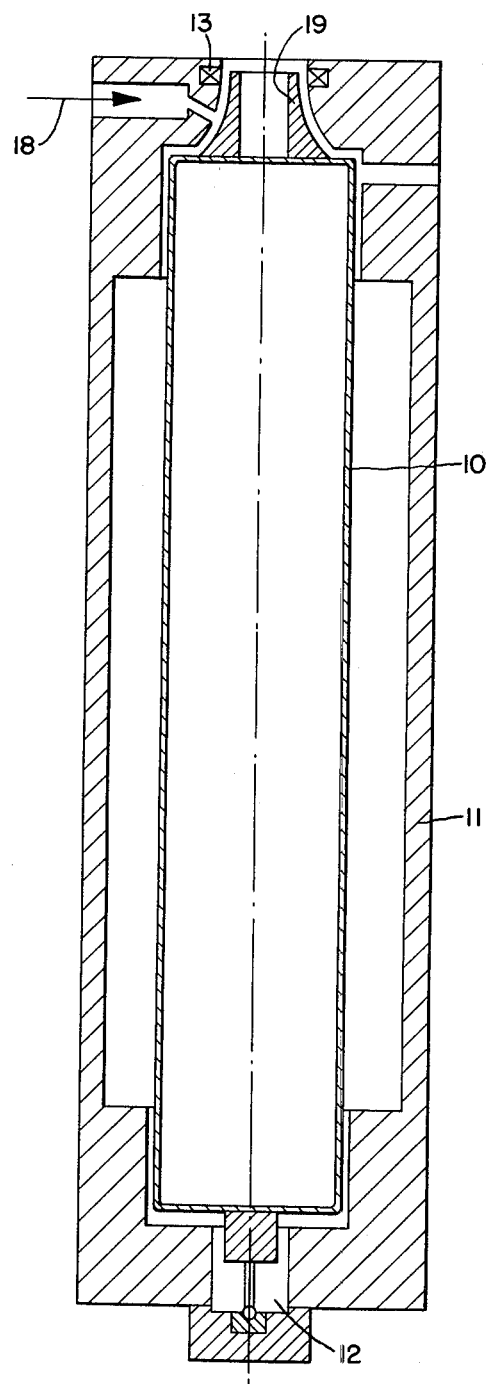
FIG. 2 is a longitudinal cross-sectional view of a vertically mounted rotor arrangement in accordance with the present invention.

As shown in FIG. 2, a rotor 10 consisting of elemental boron, produced as an integral structural component and fashioned as a centrifugal drum, is vertically supported in a housing 11. A lower spherical needle bearing 12 supports the rotor 10 axially and radially in the housing 11. The rotor 10 is guided concentrically in an upper magnetic bearing 13. A driving action for the rotor 10 is obtained by a fluid or gas jet 18 directed onto a turbine wheel 19 of the rotor 10.

Figure 3:
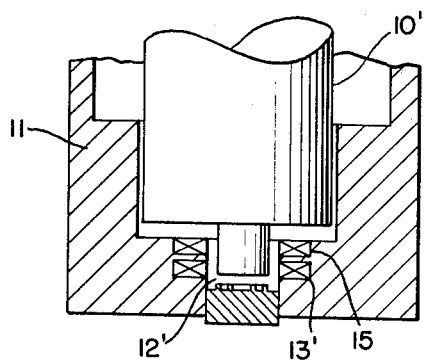
FIG. 3 is a partial cross-sectional view of a lower end of another embodiment of a rotor arrangement in accordance with the present invention.

In FIG. 3, a rotor 10' is closed at the bottom end thereof and is supported axially by means of a gas or fluid bearing 12' and radially by means of a magnetic bearing 13' with an electric motor being provided as a drive mechanism for the rotor 10'.

As shown in FIG. 4, a boron rotor 30 is provided with an end lid 31 integrally formed with the rotor 30 and a second end lid 32 constructed as a separate component. Extensions are provided on the end lids 31, 32 for receiving bearing and drive elements (not shown) with rings of boron or some other material being provided at the extensions for stress equalization.

FIG. 5 provides an example of a "two story" rotor generally designated by the reference numeral 35 constructed of elemental boron with a tubular fold, concomitantly formed during a vapor-phase deposition step, imparting to the individual tubular sections 37, 38 in the center of the rotor 35, a high flexing capability while traversing the critical speed with a relatively low load on the bearings mounting the rotor 35.

As readily apparent, the configuration of the rotors constructed in accordance with the present invention can readily be adapted to a great variety of different requirements and/or uses.

While we have shown and described several embodiments in accordance with the present invention, it is to be understood that the same is not limited thereto, but is susceptible of numerous changes and modifications as would be known to a person skilled in the art to which it pertains, and we therefor do not wish to be restricted to the details shown and described hereinabove, but intend to cover all such changes and modifications as are encompassed by the scope of the appended claims.

We claim:

1. A rotor arrangement including a rotor element constructed as a hollow member such as a centrifugal drum operable at high peripheral speeds, characterized in that the rotor element consists essentially of elemental boron.

2. A rotor arrangement adapted to be operable at high peripheral speeds, characterized in that a hollow rotor shell is provided having two open end faces, and end lid means are provided for closing the respective end faces of the rotor shell, and in that at least one of the rotor shell and end lid means consists essentially of elemental boron.

3. A rotor arrangement according to claim 2, characterized in that the rotor shell consists of elemental boron.

4. A rotor arrangement according to claim 2, characterized in that both the rotor shell and the end lid means consist of elemental boron.

5. A rotor arrangement according to claim 4, characterized in that at least one end lid means is integrally formed at one end face of the rotor shell.

6. A rotor arrangement according to claim 5, characterized in that means are provided at inner zones of each of said lid means for stress equalization of the rotor arrangement.

7. A rotor arrangement according to claim 6, characterized in that said stress equalization means are formed as support rings received on extensions provided on the lid means.

8. A rotor arrangement according to claim 7, characterized in that the support rings consist essentially of elemental boron.

9. A rotor arrangement according to claim 5, characterized in that means are provided at each of the end lid means, along inner zones thereof, for receiving at least one of bearing means and drive means.

10. A rotor arrangement according to claim 9, characterized in that, in inner zones of the end lid means, at transitions of the end lid means to the rotor shell, and toward an inner contour of the rotor shell, the end lid means are configured so as to be optimal from a stress viewpoint.

11. A rotor arrangement according to claim 10, characterized in that the rotor includes a plurality of individual tubular sections.

12. A rotor arrangement according to claim 10, characterized in that the rotor shell is fashioned with a geometrically undisturbed tubular outer surface for permitting rotation of the rotor arrangement in a sub-critical range.

13. A rotor arrangement according to claim 12, characterized in that inwardly directed annular fold-like interruptions are provided in the tubular outer surface so as to form individual tubular sections in the rotor shell.

14. A rotor arrangement according to claim 13, disposed in a housing, characterized in that means are provided for vertically mounting the rotor shell in the housing including spherical bearing means for supporting a bottom of the rotor.

15. A rotor arrangement according to claim 13, arranged in a housing, characterized in that magnetic bearing means are provided for supporting the rotor in the housing at least at one end of the rotor.

16. A rotor arrangement according to claim 13, arranged in a housing, characterized in that magnetic bearing means are provided for centering an upper end of the rotor in the housing.

17. A rotor arrangement according to claim 13, in a housing, characterized in that gas bearing means are provided for supporting and centering the rotor in the housing.

18. A rotor arrangement according to claim 13, characterized in that the rotor further includes a turbine means, and in that gas jet means are operatively associated with the turbine means for driving the rotor.

19. A rotor arrangement according to claim 2, characterized in that the rotor shell is fashioned with a geometrically undistributed tubular outer surface for permitting rotation of the rotor arrangement in a sub-critical range.

20. A rotor arrangement according to claim 2, characterized in that the rotor includes a plurality of individual tubular sections.

21. A rotor arrangement according to claim 2, characterized in that inwardly directed annular fold-like interruptions are provided in the tubular outer surface so as to form individual tubular sections in the rotor shell.

22. A rotor arrangement according to claim 2, disposed in a housing, characterized in that means are provided for vertically mounting the rotor shell in the housing including spherical bearing means for supporting a bottom of the rotor.

23. A rotor arrangement according to claim 2, arranged in a housing, characterized in that magnetic bearing means are provided for supporting the rotor in the housing at least at one end of the rotor.

24. A rotor arrangement according to claim 2, arranged in a housing, characterized in that magnetic bearing means are provided for centering an upper end of the rotor in the housing.

25. A rotor arrangement according to claim 2, in a housing, characterized in that gas bearing means are provided for supporting and centering the rotor in the housing.

26. A rotor arrangement according to claim 2, characterized in that the rotor further includes a turbine means, and in that gas jet means are operatively associated with the turbine means for driving the rotor.

* * * * *